United States Patent
Hodge et al.

(10) Patent No.: US 12,496,806 B2
(45) Date of Patent: Dec. 16, 2025

(54) BENT ALUMINUM FOAM SANDWICH WITH DELAMINATION INSERT

(71) Applicant: GM GLOBAL TECHNOLOGY OPERATIONS LLC, Detroit, MI (US)

(72) Inventors: Ethan Edward Peel Hodge, Clawson, MI (US); Johnny Brown, Port Huron, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 387 days.

(21) Appl. No.: 18/163,523

(22) Filed: Feb. 2, 2023

(65) Prior Publication Data

US 2024/0262080 A1    Aug. 8, 2024

(51) Int. Cl.
*B32B 15/04*  (2006.01)
*B32B 3/26*  (2006.01)
*B32B 5/18*  (2006.01)
*B32B 15/01*  (2006.01)
*B62D 27/02*  (2006.01)
*B62D 29/00*  (2006.01)

(52) U.S. Cl.
CPC ............ *B32B 15/046* (2013.01); *B32B 3/266* (2013.01); *B32B 5/18* (2013.01); *B32B 15/016* (2013.01); *B62D 27/02* (2013.01); *B62D 29/008* (2013.01); *B32B 2250/03* (2013.01); *B32B 2250/40* (2013.01); *B32B 2266/045* (2013.01); *B32B 2605/00* (2013.01)

(58) Field of Classification Search
CPC ..... F16B 5/0614; B62D 27/02; B62D 29/008; B62D 29/041; B62D 29/043; B62D 2250/03; B62D 2250/40; B32B 3/266; B32B 5/18; B32B 15/016; B32B 15/046; B32B 15/20

See application file for complete search history.

(56) References Cited

U.S. PATENT DOCUMENTS

2023/0124611 A1* 4/2023 Lutz ................. B62D 29/041
                                                              403/309

FOREIGN PATENT DOCUMENTS

DE   10350953 A1   6/2005
EP    1136148 A2   9/2001

OTHER PUBLICATIONS

German Office Action for German Application No. 102023122959.1; dated May 15, 2025; 4 pages.

* cited by examiner

*Primary Examiner* — Catherine A. Simone
(74) *Attorney, Agent, or Firm* — CANTOR COLBURN LLP (57) ABSTRACT

Aspects of the disclosure include a bent aluminum foam sandwich having a delamination insert. An exemplary bent aluminum foam sandwich can include an inner sheet, an outer sheet having a through-hole, and a core between the inner sheet and the outer sheet. A delamination insert is positioned at a bending interface between the inner sheet and the outer sheet such that sidewalls of the delamination insert are in direct contact with the core and the inner sheet. The delamination insert includes a tab positioned to extend through the through-hole.

20 Claims, 7 Drawing Sheets

BENT ALUMINUM FOAM SANDWICH WITH DELAMINATION INSERT

INTRODUCTION

The subject disclosure relates to manufacturing and construction materials and technologies, and particularly to a bent aluminum foam sandwich having a delamination insert.

An aluminum foam sandwich is a sandwich panel product typically made of a porous aluminum metal foam core formed between two aluminum sheets (commonly referred to as an inner sheet and an outer sheet). Recently, manufacturers and material scientists have began incorporating aluminum foam sandwiches in a wide range of applications to take advantage of the aluminum foam sandwich's multitude of favorable material characteristics. The aluminum foam sandwich has broad applicability in vehicle applications (as lightweight frames, shells, supports, etc., in automobiles, trains, trucks, and aircraft), aerospace, buildings (both structural and design components), and electronics (substrates, supports, etc.).

In particular, the aluminum foam sandwich is a lightweight structural material having a relatively high stiffness-to-mass ratio and favorable energy absorption capacities when compared to steel and other materials. For example, the aluminum foam sandwich is capable of absorbing relatively high impact energies due to its native plastic deformation properties. Moreover, the aluminum foam sandwich is superior in heat resistance and nonflammability to non-metallic foams, such as polystyrene foam. Ease of manufacturing is also a key consideration, as an aluminum foam sandwich can be fabricated and processed at a lower temperature than steel.

SUMMARY

In one exemplary embodiment a bent aluminum foam sandwich can include an inner sheet, an outer sheet having a through-hole, and a core between the inner sheet and the outer sheet. A delamination insert is positioned at a bending interface between the inner sheet and the outer sheet such that sidewalls of the delamination insert are in direct contact with the core and the inner sheet. The delamination insert includes a tab positioned to extend through the through-hole.

In addition to one or more of the features described herein, in some embodiments, the core includes a porous foam core, the inner sheet includes aluminum, and the outer sheet includes aluminum.

In some embodiments, a weld is positioned across the through-hole and in direct contact with the tab of the delamination insert.

In some embodiments, a leading edge of the delamination insert is in direct contact with a surface of the outer sheet. In some embodiments, a trailing edge opposite the leading edge of the delamination insert extends beyond a surface of the inner sheet.

In some embodiments, portions of the inner sheet and portions of the porous foam core are removed to expose the surface of the outer sheet. In some embodiments, the portions of the inner sheet and the portions of the porous foam core are removed at a 45 degree angle with respect to the surface of the outer sheet.

In another exemplary embodiment a vehicle includes a component made from a bent aluminum foam sandwich. The bent aluminum foam sandwich can include an inner sheet, an outer sheet having a through-hole, and a core between the inner sheet and the outer sheet. A delamination insert is positioned at a bending interface between the inner sheet and the outer sheet such that sidewalls of the delamination insert are in direct contact with the core and the inner sheet. The delamination insert includes a tab positioned to extend through the through-hole.

In yet another exemplary embodiment a method for forming a bent aluminum foam sandwich can include providing an inner sheet, an outer sheet having a through-hole, and a core between the inner sheet and the outer sheet. The method includes positioning a delamination insert at a bending interface between the inner sheet and the outer sheet such that sidewalls of the delamination insert are in direct contact with the core and the inner sheet. The delamination insert includes a tab positioned to extend through the through-hole.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
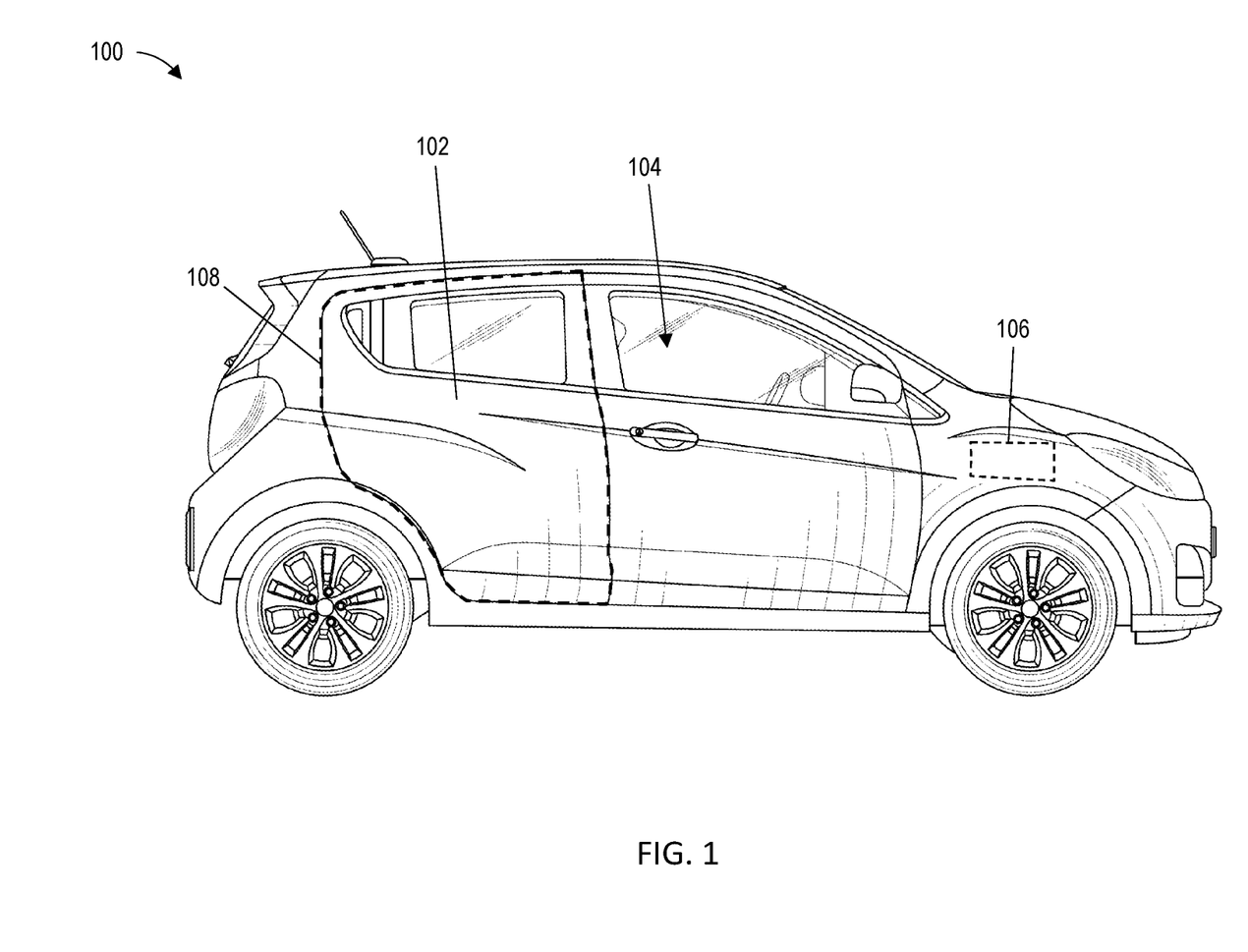
FIG. 1 is a vehicle configured in accordance with one or more embodiments.

A vehicle, in accordance with an exemplary embodiment, is indicated generally at 100 in FIG. 1. Vehicle 100 is shown in the form of an automobile having a body 102. Body 102 includes a passenger compartment 104 within which are arranged a steering wheel, front seats, and rear passenger seats (not separately indicated). The various components within the passenger compartment 104 are illustrative only, and are not meant to be particularly limited. Within the body 102 are arranged a number of components, including, for example, an electric motor 106 (shown by projection under the front hood). The electric motor 106 is shown for ease of illustration and discussion only. It should be understood that the configuration, location, size, arrangement, etc., of the electric motor 106 is not meant to be particularly limited, and all such configurations (including multi-motor configurations) are within the contemplated scope of this disclosure.

As will be detailed herein, one or more component(s) 108 of the body 102 (as shown, a rear door) can be made of a bent aluminum foam sandwich configured in accordance with one or more embodiments. The component 108 is shown for ease of illustration and discussion only. It should be understood that any component of the body 102 (and in fact, many components of the vehicle 100 generally) can be made in whole or in part using a bent aluminum foam sandwich configured in accordance with one or more embodiments. Moreover, while the present disclosure is discussed primarily in the context of a component 108 of the vehicle 100 for ease of illustration and discussion, aspects described herein can be similarly incorporated within any manufacturing and construction application, including, but not limited to vehicles (e.g., as lightweight frames, shells, supports, etc., in automobiles, trains, trucks, and aircraft), aerospace applications, buildings (as both structural and design components), and electronics (e.g., as substrates, supports, etc.), and all such configurations and applications are within the contemplated scope of this disclosure.

As discussed previously, aluminum foam sandwiches are desirable across a range of applications due to a unique offering of characteristics, including, for example, low gravity, high specific stiffness, high specific strength, shock resistance (energy absorption), vibration damping, sound absorption, and electromagnetic shielding. Unfortunately, aluminum foam sandwich fabrication techniques are somewhat limited to planar, mostly flat sheet-style applications, as bending an aluminum foam sandwich to create complex geometries results in delamination of the core foam from the inner and outer sheets. For applications that require complex geometrics manufacturers typically create their own customized fixtures and blow in their own aluminum foam composition—a complex, expensive, low-scale solution.

This disclosure introduces a new type of aluminum foam sandwich and a bending process for the same that enables the commonly available, planar (flat) aluminum foam sandwich to be bent to accommodate complex geometries without causing delamination. The process begins with a flat aluminum foam sandwich made of an inner sheet, an outer sheet, and a porous foam core between the inner and outer sheets. The aluminum foam sandwich is cleaned, cut, and/or otherwise processed to create an initial, planar layout. This cutting/shaping process (also referred to as rough-in) involves both sheets and the foam core. After the initial rough-in, the inner sheet of the aluminum foam sandwich is then cut using, for example, 45 degree miter cuts, and portions of the foam core are removed (shaved, cut, grinded, sanded, etc.) to allow the aluminum foam sandwich to be folded. Notably, the outer sheet of the aluminum foam sandwich is not cut during this process. In other words, the outer sheet is retained as a single, continuous piece (although shaped from the initial rough-in).

In some embodiments, once the inner sheet is cut for folding, one or more holes are opened in the outer sheet at the bending interface between the inner sheet and the outer sheet. The inner sheet is bent towards the outer sheet and an insert having one or more tabs is placed into the bend against the outer sheet such that an end of the tab(s) protrudes through the hole(s). The tabs and holes serve to interlock the insert and the outer sheet together. The insert can be further fixed to the bent aluminum foam sandwich by welding or otherwise fixing (using, e.g., adhesives, laser welding, etc.) the insert to one or both of the outer sheet and inner sheet. In some embodiments, a weld is made on the outer sheet across all exposed tabs.

In some embodiments, once the inner sheet is cut for folding, the inner sheet is bent towards the outer sheet and an insert having one or more tabs is placed into the bend directly against an inner surface of the outer sheet. The insert can be fixed to the bent aluminum foam sandwich by welding or otherwise fixing (using, e.g., adhesives) the insert to the inner surface of the outer sheet (i.e., without the use of through-holes).

Components constructed with bent aluminum foam sandwiches in accordance with one or more embodiments offer several technical advantages over prior solutions. In particular, once assembled, the insert(s) in the bent aluminum foam sandwich has been found to increase the overall structural performance of the piece substantially, even when the bent aluminum foam sandwich is bent to complex geometries, and solves the main failure mode in bending an aluminum foam sandwich—elimination of the metal foam from its parent sheet material. Moreover, inserts connecting the inner and outer sheets need not be limited strictly to the bending interface, as inserts can be placed arbitrarily throughout the aluminum foam sandwich (e.g., as tear stoppers, etc.) to further prevent delamination and to improve the overall structural characteristics of a bent aluminum foam sandwich. Advantageously, the bent aluminum foam sandwiches described herein can be easily integrated into the body structure, chassis, or other component of a vehicle, building, etc., using straightforward solutions such as mechanical fasteners and welding. Techniques described herein enable commonly available planar aluminum foam sandwiches to be modified to accommodate any complex geometry more efficiently and at higher scale than current, customized solutions.

Figure 2:
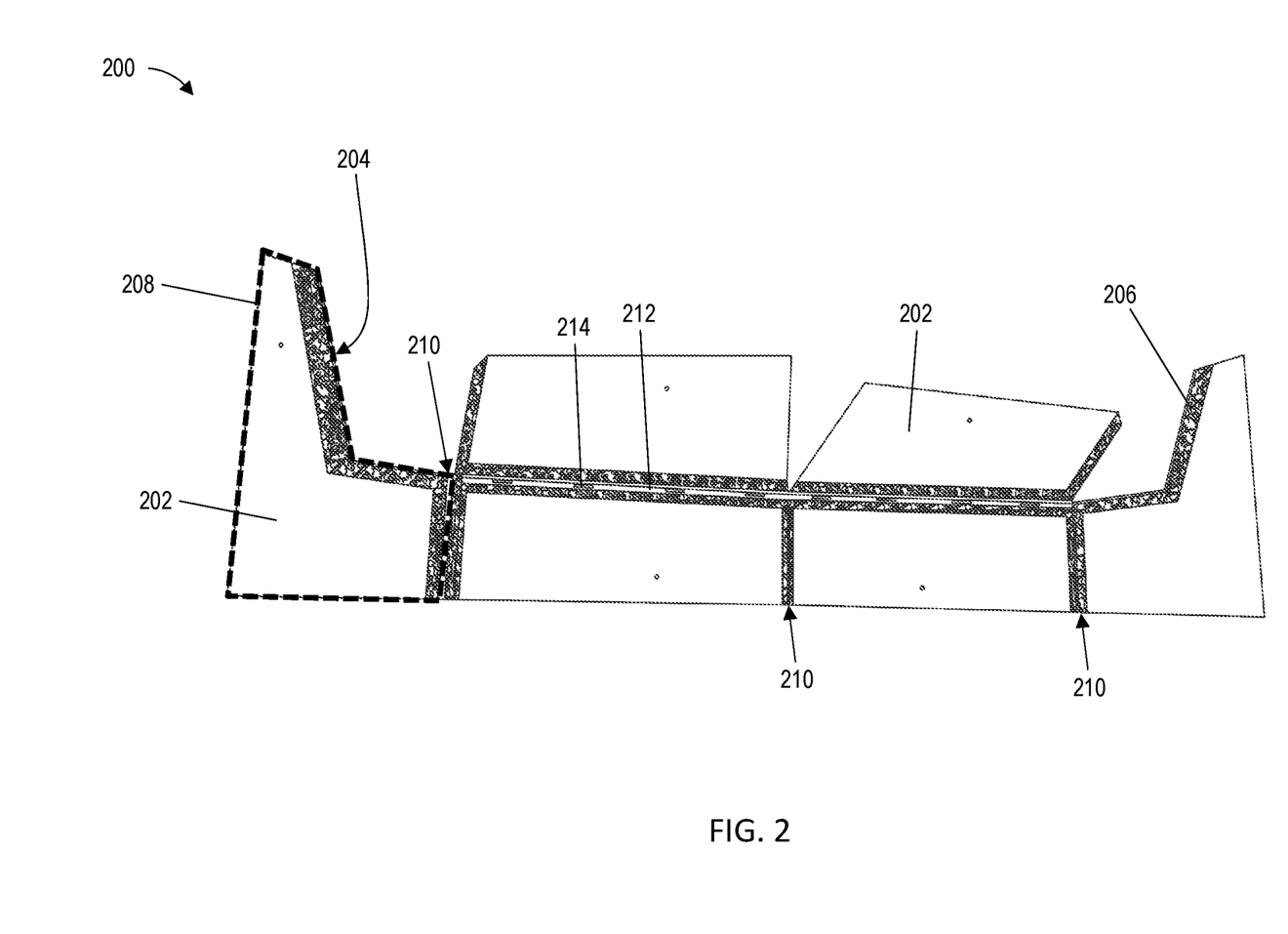
FIG. 2 is a view of an aluminum foam sandwich after shaping the inner and outer sheets in accordance with one or more embodiments.

FIG. 2 is a view of an aluminum foam sandwich 200 in accordance with one or more embodiments. The aluminum foam sandwich 200 can be a structural and/or design element of an electric vehicle (e.g., one or more component(s) 108 of the body 102 of the vehicle 100), although other applications (for vehicles, structures, or otherwise) are within the contemplated scope of this disclosure. In some embodiments, the component 108 of the body 102 of the vehicle 100 (refer to FIG. 1) is manufactured in whole or in part by bending, shaping, welding, and otherwise processing a raw (planar, flat) aluminum foam sandwich (not separately shown) as will be described in further detail herein.

As shown in FIG. 2, the aluminum foam sandwich 200 includes an inner sheet 202, an outer sheet 204, and a porous foam core 206 between the inner sheet 202 and the outer sheet 204. In some embodiments, the inner sheet 202 and the outer sheet 204 are aluminum sheets, although other materials, such as non-aluminum metals (e.g., steel, copper, etc.), nonmetals (e.g., ceramics), and/or aluminum alloys are within the contemplated scope of this disclosure. The inner sheet 202 and the outer sheet 204 can be shaped to any desired thickness using processes such as, for example, rolling and/or stamping to a desired face sheet thickness.

In some embodiments, the porous foam core 206 is an aluminum or aluminum alloy core (e.g., $AlCu_4$, $AlSi_9Cu_3$, aluminum-magnesium alloys, etc.). The porous foam core 206 is not meant to be particularly limited, but can include, for example, closed-cell and/or open-cell configurations (refer to FIG. 4). In some embodiments, the porous foam core 206 is produced from a liquid metal and/or by powder metallurgy. In some embodiments, a foamable precursor (not separately shown) is expanded between the inner sheet 202 and the outer sheet 204. The precursor composition can include, for example, Al—Si alloys, Al—Si—Cu alloys, and/or Al—Si—Mg alloys.

In some embodiments, when the foamable precursor and/or liquid metal contacts the surfaces of the inner sheet 202 and the outer sheet 204 a chemical bond is established. In some embodiments, the porous foam core 206 and/or precursor materials are bonded to the inner sheet 202 and the outer sheet 204 using adhesive bonding, brazing, and/or diffusion bonding techniques. In some embodiments, the precursor includes a foamable molten metal that is injected between the inner sheet 202 and the outer sheet 204. The foamable molten metal can be rapidly solidified (e.g., cooled), allowing the interior of the molten metal to foam. For powder metallurgy approaches, metal powders undergo compaction together with the inner sheet 202 and the outer sheet 204. The resultant sandwich-compact composite is heated to transform the core layer into foam. In some embodiments, the melting point of the inner sheet 202 and the outer sheet 204 material is above the melting point of the foamable metal powder precursors.

In some embodiments, the aluminum foam sandwich 200 begins as a raw (planar) aluminum foam sandwich (not separately shown). In some embodiments, the inner sheet 202, the outer sheet 204, and the porous foam core 206 are cut through or otherwise processed to form an initial, roughed-in shape.

In some embodiments, after the initial rough-in, portions of the inner sheet 202 and the porous foam core 206 are removed at an angle to define one or more portions 208 of the aluminum foam sandwich 200, each separated at a bending interface 210. A single portion 208 is outlined in FIG. 2 for ease of discussion. Notably, the outer sheet 204 is not cut or otherwise removed during this process. In other words, the outer sheet 204 is retained as a single, continuous sheet and the portions 208 thereby define a single, continuous part. Portions of the inner sheet 202 and the porous foam core 206 can be removed using, for example, cutting, shaving, grinding, sanding, etc. In some embodiments, portions of the inner sheet 202 and the porous foam core 206 are cut using 45 degree miter cuts, although other cutting techniques at any cut angle (cut degree), depending on the desired configuration, after folding, of the aluminum foam sandwich 200, are within the contemplated scope of this disclosure. In other words, the inner sheet 202 and the porous foam core 206 can be cut at any desired angle (e.g., 5 degrees, 20 degrees, 60 degrees, 80 degrees, etc.) to accommodate any arbitrary bending configuration, limited only by the tooling limitations associated with the chosen cutting method.

In some embodiments, a portion 212 of the outer sheet 204 is exposed after removing portions of the inner sheet 202 and the porous foam core 206 to define the portions 208. In some embodiments, one or more through-holes 214 are formed in the portion 212 of the outer sheet 204. The through-holes 214 can be formed using any suitable process, such as, for example, cutting through the outer sheet 204. Observe that the through-holes 214 will be positioned in the bending interface 210 between two portions 208 of the aluminum foam sandwich 200.

Figure 3:
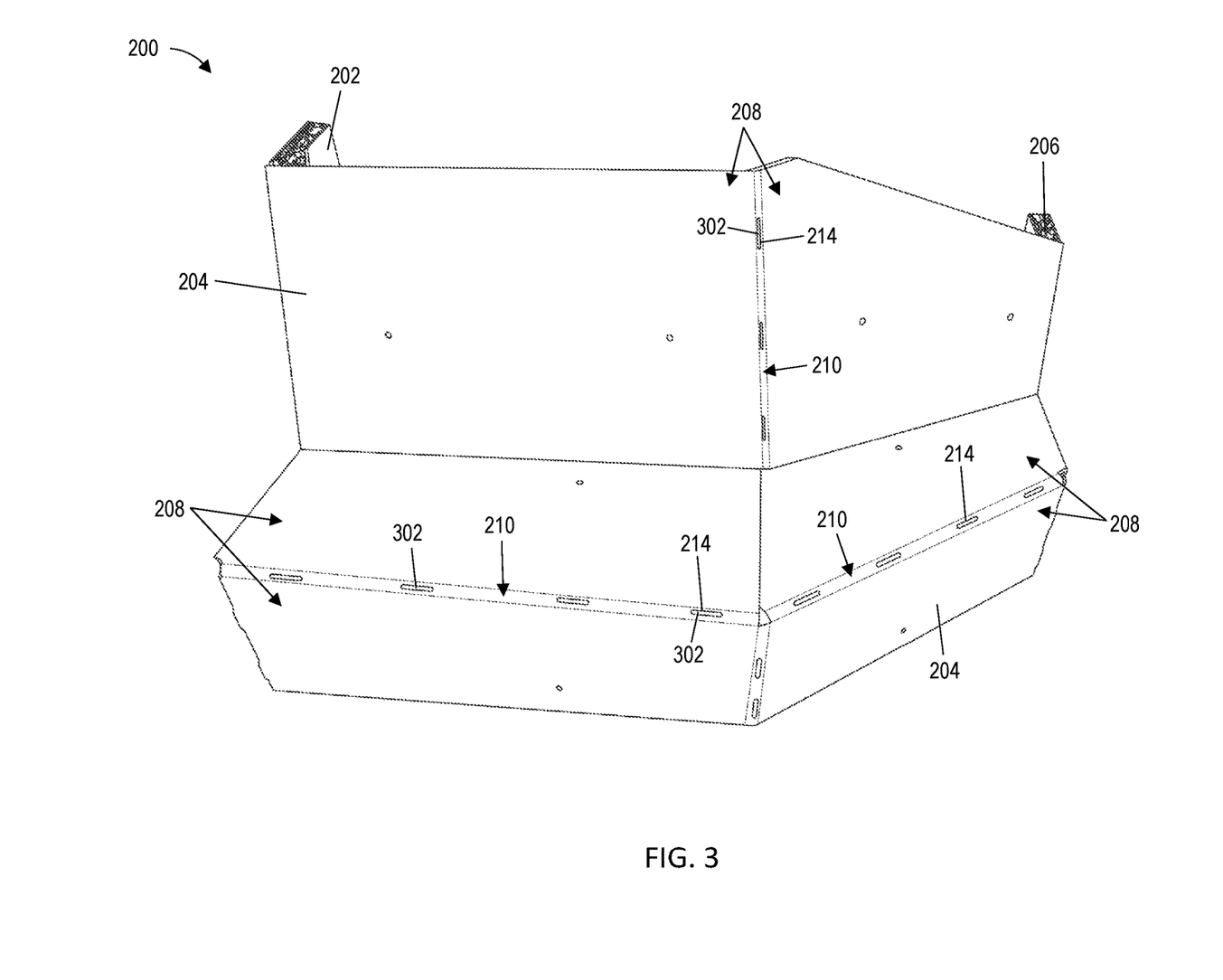
FIG. 3 is a view of the aluminum foam sandwich after bending in accordance with one or more embodiments.

FIG. 3 is a view of the aluminum foam sandwich 200 after bending the portions 208 in accordance with one or more embodiments. In some embodiments, the portions 208 are bent towards each other along each bending interface 210. FIG. 3 merely represents an example configuration for the aluminum foam sandwich 200 after bending the portions 208. It should be understood that the aluminum foam sandwich 200 can include more, or fewer, portions 208 having the same, or different, configurations (shapes) than that depicted. By changing the number and shape of the portions 208 and the location of the bending interfaces 210, the final, bent configuration of the aluminum foam sandwich 200 can be modified as desired for a given application, and all such configurations are within the contemplated scope of this disclosure.

In some embodiments, one or more delamination insert(s) 302 are positioned between respective portions 208 of the aluminum foam sandwich 200. The delamination inserts 302 can be made of a same, or different, material than the inner sheet 202 and the outer sheet 204. For example, the delamination inserts 302 can be made of aluminum, aluminum alloys, steel, steel alloys, nonmetals, and combinations thereof. The delamination inserts 302 can be made to any desired thickness. In some embodiments, the delamination inserts 302 are formed to a thickness that is smaller than a width of the through-holes 214.

In some embodiments, each delamination insert 302 is positioned along a bending interface 210 between the respective portions 208. In some embodiments, a delamination insert 302 includes one or more extension portions or tabs (refer to FIG. 5), each configured to extend through a respective one of the through-holes 214. In other words, a delamination insert 302 can be placed into a bend (i.e., at a bending interface 210) against the outer sheet 204 such that an end of a tab protrudes through a respective through-hole 214. Advantageously, positioning one or more delamination inserts 302 within the aluminum foam sandwich 200 in this manner has been found to prevent delamination of the porous foam core 206 from the inner sheet 202 and the outer sheet 204. Moreover, the tabs and through-holes 214 serve to interlock the delamination insert 302 and the outer sheet 204 together. In some embodiments, the portions 208 are bent towards each other along each bending interface 210 after interlocking the delamination insert 302 with the outer sheet 204.

Figure 4:
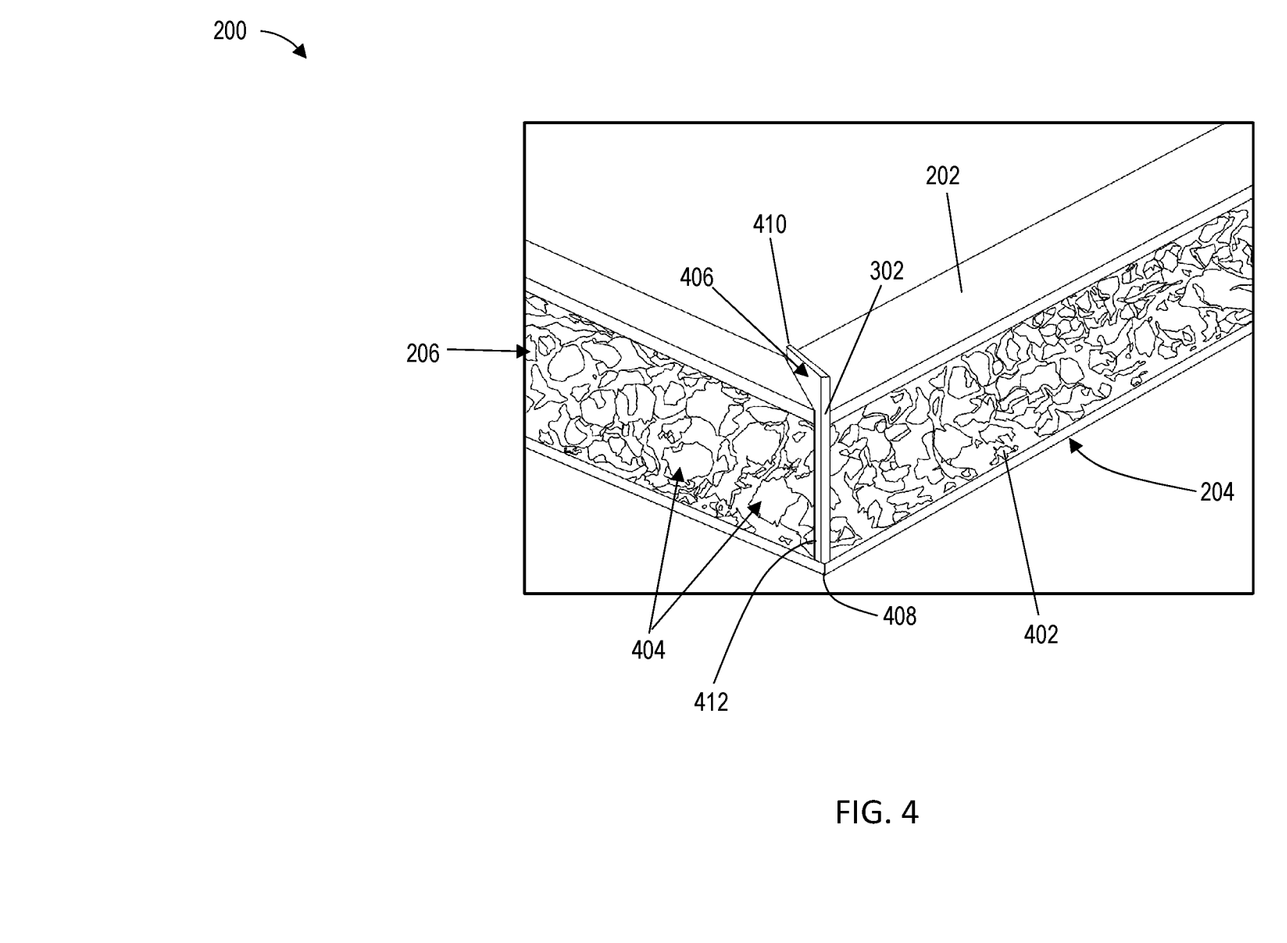
FIG. 4 is a cross-sectional view of the aluminum foam sandwich after insertion of a delamination insert in accordance with one or more embodiments.

FIG. 4 is a cross-sectional view of a portion of the aluminum foam sandwich 200 after insertion of the delamination insert 302 in accordance with one or more embodiments. As shown in FIG. 4, the porous foam core 206 can include a metal mesh 402 and a plurality of pores 404. In some embodiments, the metal mesh 402 of the porous foam core 206 is fixed to the inner sheet 202 and the outer sheet 204. For example, the metal mesh 402 can include a metal material (e.g., aluminum, aluminum alloy, etc.) that is welded and/or direct bonded under heat to the material of the inner sheet 202 and the outer sheet 204.

As further shown in FIG. 4, in some embodiments, a portion 406 of the delamination insert 302 extends past the inner sheet 202. The length by which the portion 406 extends past the inner sheet 202 is not meant to be particularly limited. The portion 406 of the delamination insert 302 can serve as an anchor location for one or more welds (not separately shown) placed between the delamination insert 302 and the inner sheet 202.

In some embodiments, the delamination insert 302 includes a leading edge 408 and a trailing edge 410. In some embodiments, the leading edge 408 is in direct contact with the outer sheet 204. In some embodiments, the trailing edge 410 extends beyond the inner sheet 202 (as shown in FIG. 4). In some embodiments, the trailing edge 410 is flush with the inner sheet 202 (within manufacturing tolerances, not separately shown). In some embodiments, sidewalls 412 of the delamination insert 302 are in direct contact with the porous foam core 206 and the inner sheet 202.

Figure 5:
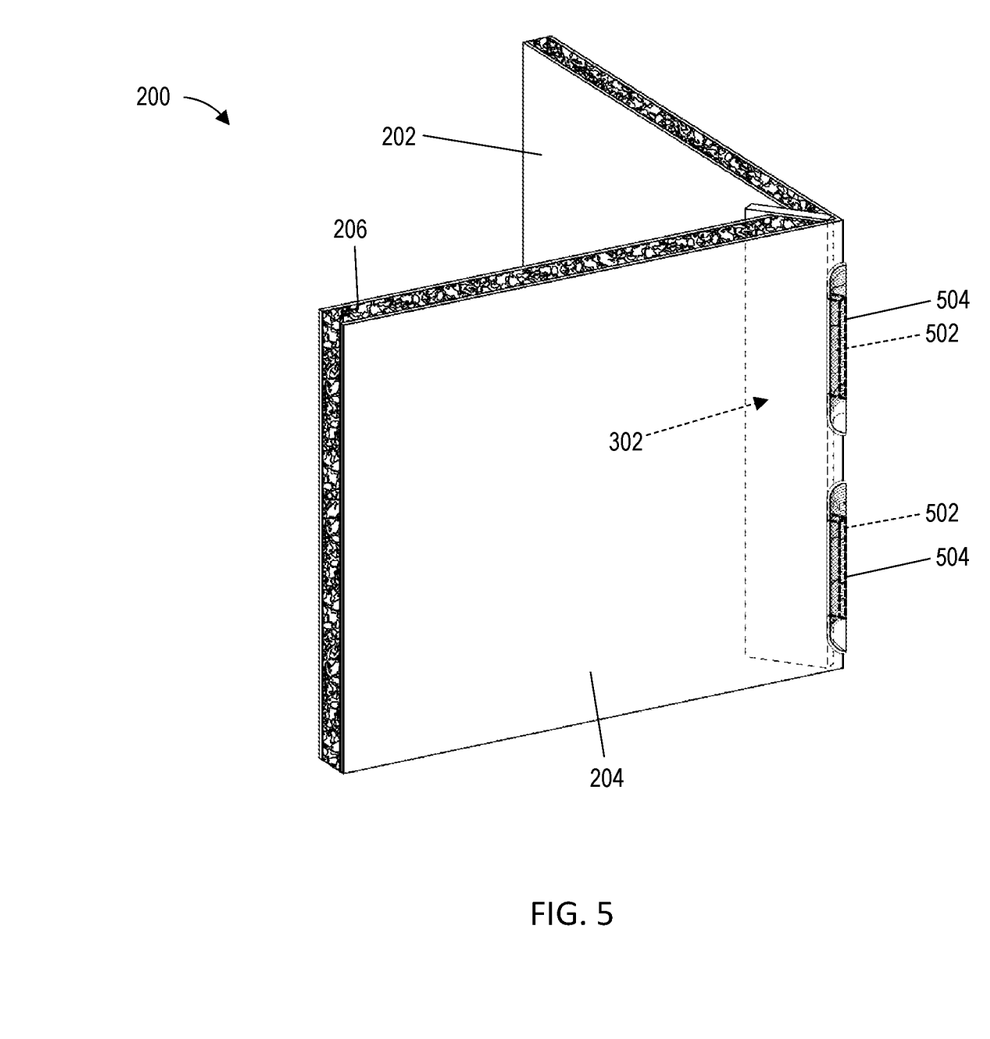
FIG. 5 is a front side view of the aluminum foam sandwich after bonding the delamination insert to the outer sheet in accordance with one or more embodiments.

FIG. 5 is a front side view of the aluminum foam sandwich 200 after bonding the delamination insert 302 to the outer sheet 204 in accordance with one or more embodiments. In some embodiments, the delamination insert 302 includes a tab 502. As discussed previously, in some embodiments, the tab 502 is sized to fit within a through-hole 214 (refer to FIG. 3). In some embodiments, the tab 502 extends from the delamination insert 302 by a distance equal to or greater than a thickness of the outer sheet 204. In this manner, the tab 502 can fully penetrate the through-hole 214.

In some embodiments, the delamination insert 302 can be further fixed to the outer sheet 204 of the aluminum foam sandwich 200 by bonding the delamination insert 302 to the outer sheet 204. In some embodiments, one or more welds 504 are made across the through-hole 214, the tab 502 of the delamination insert 302, and the outer sheet 204. In some embodiments, one or more welds 504 are made on the outer sheet 204 across all exposed tabs 502.

Figure 6:
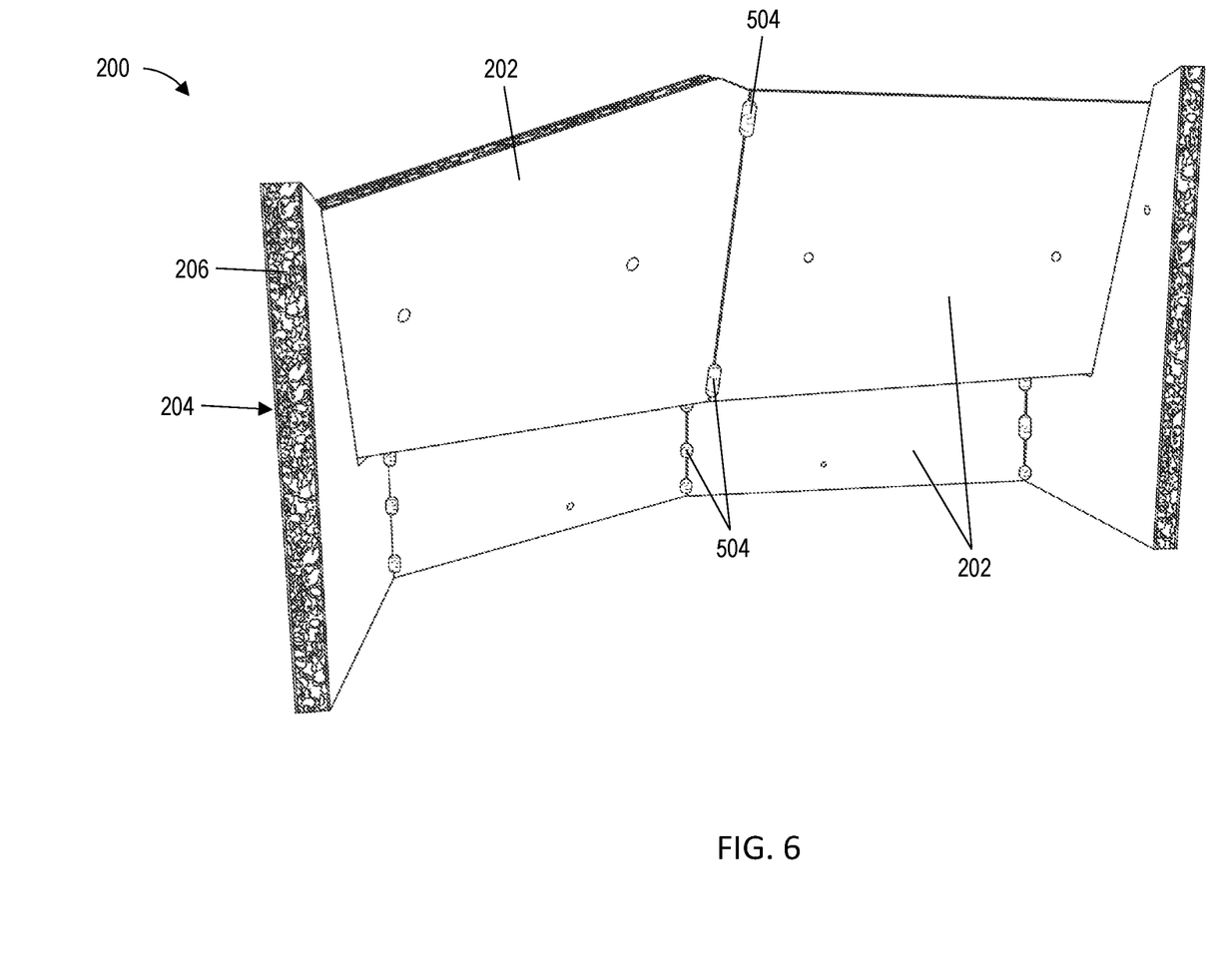
FIG. 6 is a back side view of the aluminum foam sandwich after bonding the delamination insert to the inner sheet in accordance with one or more embodiments.

FIG. 6 is a back side view of the aluminum foam sandwich 200 after bonding the delamination insert 302 to the inner sheet 202 in accordance with one or more embodiments. The delamination insert 302 can be fixed to the inner sheet 202 in a similar manner as described previously with respect to the outer sheet 204 (refer FIG. 5). For example, in some embodiments, the delamination insert 302 can be further fixed to the inner sheet 202 of the aluminum foam sandwich 200 by forming one or more welds 504 between and/or over the portion 406 of the delamination insert 302 and the inner sheet 202 (refer to FIG. 6).

Figure 7:
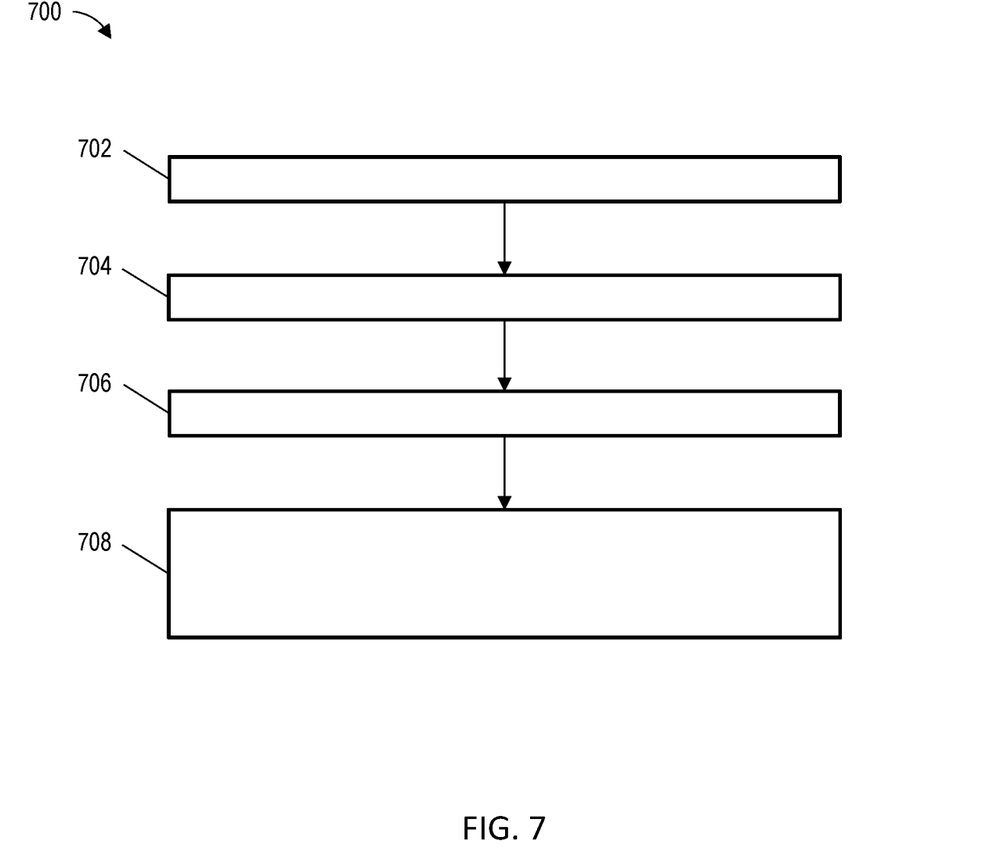
FIG. 7 is a flowchart in accordance with one or more embodiments.

Referring now to FIG. 7, a flowchart 700 for providing a bent aluminum foam sandwich having a delamination insert is generally shown according to an embodiment. The flowchart 700 is described in reference to FIGS. 1 to 6 and may include additional steps not depicted in FIG. 7. Although depicted in a particular order, the blocks depicted in FIG. 7 can be rearranged, subdivided, and/or combined.

At block 702, an inner sheet is formed. At block 704, an outer sheet is formed. In some embodiments, one or more through-holes are formed in the outer sheet. At block 706, a core is formed between the inner sheet and the outer sheet. In some embodiments, the core includes a porous foam core, the inner sheet includes aluminum, and the outer sheet includes aluminum. In some embodiments, the method includes receiving a pre-fabricated, planar aluminum foam sandwich including the formed inner sheet, outer sheet, and core.

In some embodiments, a planar aluminum foam sandwich is cut and/or otherwise processed to create an initial, planar layout. In some embodiments, the cutting/shaping process (also referred to as rough-in) involves patterning both sheets and the core. After the initial rough-in, the inner sheet is further cut using, for example, 45 degree miter cuts, and portions of the foam core are removed (shaved, cut, grinded, sanded, etc.) to allow the planar aluminum foam sandwich to be folded (bent)—resulting in a bent aluminum foam sandwich. Notably, the outer sheet of the aluminum foam sandwich is not cut during this process. In other words, the outer sheet, and consequently, the bent aluminum foam sandwich itself, is retained as a single, continuous piece (although the outer sheet is shaped from the initial rough-in).

At block 708, a delamination insert is positioned at a bending interface between the inner sheet and the outer sheet such that sidewalls of the delamination insert are in direct contact with portions of the core and the inner sheet. In some embodiments, the delamination insert includes a tab positioned to extend through the through-hole.

The method can further include positioning a weld across the through-hole and in direct contact with the tab of the delamination insert.

In some embodiments, a leading edge of the delamination insert is in direct contact with a surface of the outer sheet. In some embodiments, a trailing edge opposite the leading edge of the delamination insert extends beyond a surface of the inner sheet.

In some embodiments, portions of the inner sheet and portions of the porous foam core are removed to expose the surface of the outer sheet. In some embodiments, the portions of the inner sheet and the portions of the porous foam core are removed at a 45 degree angle with respect to the surface of the outer sheet.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A bent aluminum foam sandwich comprising:
an inner sheet cut into a first portion and a second portion along a bending interface;
an outer sheet comprising a through-hole, the outer sheet further comprising a single, continuous piece;
the first portion and second portion of the inner sheet bent towards the outer sheet;
a core between the inner sheet and the outer sheet; and
a delamination insert comprising a first sidewall, a second sidewall, a leading edge between and in direct contact with the first sidewall and the second sidewall, and a trailing edge opposite the leading edge, the delamination insert positioned at the bending interface between the inner sheet and the outer sheet such that the first sidewall of the delamination insert is in direct contact with the core and the first portion of the inner sheet and the second sidewall of the delamination insert is in direct contact with the core and the second portion of the inner sheet, the delamination insert comprising a tab extending from the leading edge and through the through-hole.

2. The bent aluminum foam sandwich of claim 1, wherein the core comprises a porous foam core, the inner sheet comprises aluminum, and the outer sheet comprises aluminum.

3. The bent aluminum foam sandwich of claim 1, further comprising a weld positioned across the through-hole and in direct contact with the tab of the delamination insert.

4. The bent aluminum foam sandwich of claim 1, wherein the leading edge of the delamination insert is in direct contact with a surface of the outer sheet.

5. The bent aluminum foam sandwich of claim 4, wherein portions of the inner sheet and portions of the core are removed to expose the surface of the outer sheet.

6. The bent aluminum foam sandwich of claim 5, wherein the portions of the inner sheet and the portions of the core are removed at a 45 degree angle with respect to the surface of the outer sheet.

7. The bent aluminum foam sandwich of claim 4, wherein the trailing edge opposite the leading edge of the delamination insert extends beyond a surface of the inner sheet.

8. A vehicle comprising:
a component comprising a bent aluminum foam sandwich, the bent aluminum foam sandwich comprising:
an inner sheet cut into a first portion and a second portion along a bending interface;
an outer sheet comprising a through-hole, the outer sheet further comprising a single, continuous piece;
the first portion and second portion of the inner sheet bent towards the outer sheet;
a core between the inner sheet and the outer sheet; and
a delamination insert comprising a first sidewall, a second sidewall, a leading edge between and in direct contact with the first sidewall and the second sidewall, and a trailing edge opposite the leading edge, the delamination insert positioned at the bending interface between the inner sheet and the outer sheet such that the first sidewall of the delamination insert is in direct contact with the core and the first portion of the inner sheet and the second sidewall of the delamination insert is in direct contact with the core and the second portion of the inner sheet, the delamination insert comprising a tab extending from the leading edge and through the through-hole.

9. The vehicle of claim 8, wherein the core comprises a porous foam core, the inner sheet comprises aluminum, and the outer sheet comprises aluminum.

10. The vehicle of claim 8, further comprising a weld positioned across the through-hole and in direct contact with the tab of the delamination insert.

11. The vehicle of claim 8, wherein the leading edge of the delamination insert is in direct contact with a surface of the outer sheet.

12. The vehicle of claim 11, wherein portions of the inner sheet and portions of the core are removed to expose the surface of the outer sheet.

13. The vehicle of claim 12, wherein the portions of the inner sheet and the portions of the core are removed at a 45 degree angle with respect to the surface of the outer sheet.

14. The vehicle of claim 11, wherein the trailing edge opposite the leading edge of the delamination insert extends beyond a surface of the inner sheet.

15. A method for providing a bent aluminum foam sandwich, the method comprising:
receiving an aluminum foam sandwich comprising:
an inner sheet cut into a first portion and a second portion along a bending interface;
an outer sheet comprising a through-hole, the outer sheet further comprising a single, continuous piece; and
a core between the inner sheet and the outer sheet; and
bending the first portion and second portion of the inner sheet towards the outer sheet;
positioning a delamination insert comprising a first sidewall, a second sidewall, a leading edge between and in direct contact with the first sidewall and the second sidewall, and a trailing edge opposite the leading edge at a bending interface between the inner sheet and the outer sheet such that the first sidewall of the delamination insert is in direct contact with the core and the first portion of the inner sheet and the second sidewall of the delamination insert is in direct contact with the core and the second portion of the inner sheet, the delamination insert comprising a tab extending from the leading edge and through the through-hole.

16. The method of claim 15, wherein the core comprises a porous foam core, the inner sheet comprises aluminum, and the outer sheet comprises aluminum.

17. The method of claim 15, further comprising a weld positioned across the through-hole and in direct contact with the tab of the delamination insert.

18. The method of claim 15, wherein the leading edge of the delamination insert is in direct contact with a surface of the outer sheet.

19. The method of claim 18, wherein portions of the inner sheet and portions of the core are removed to expose the surface of the outer sheet.

20. The method of claim 19, wherein the portions of the inner sheet and the portions of the core are removed at a 45 degree angle with respect to the surface of the outer sheet.

* * * * *